Jan. 5, 1932.  J. B. STRAUSS  1,839,812
EYEBAR
Filed Aug. 12, 1927
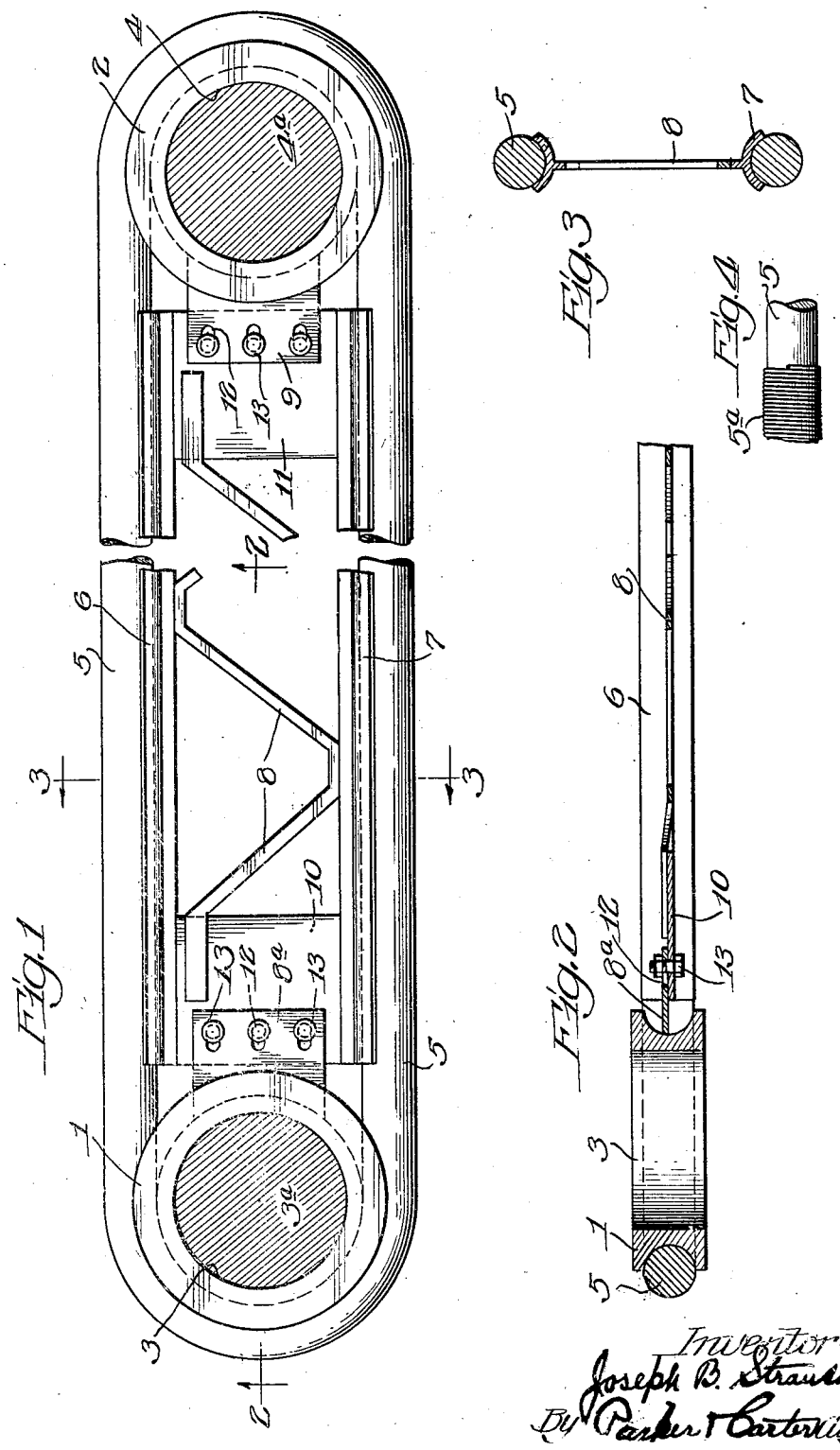

Patented Jan. 5, 1932

1,839,812

UNITED STATES PATENT OFFICE

JOSEPH B. STRAUSS, OF CHICAGO, ILLINOIS

EYEBAR

Application filed August 12, 1927. Serial No. 212,399.

This invention relates to improvements in eye bars and has for its objects to provide a new and improved device of this description.

The invention has as a further object to provide an eye bar which shall be light and yet have great strength.

The invention has as a further object to provide an eye bar particularly adapted for use in bridges and similar structures.

Eye bars for bridges and the like must necessarily be strong. It is the practice at present to make them of solid steel and heat treat them to increase their strength. This is a delicate and uncertain method and a method which is exceedingly expensive.

One of the objects of my present invention is to provide an eye bar whereby this uncertainty and expense is eliminated and which shall at the same time be as strong or stronger than the heat treated eye bars.

The invention has further objects which are more particularly pointed out in the accompanying description.

Referring now to the drawings, Fig. 1 is a side elevation in part section of one form of eye bar embodying the invention.

Fig. 2 is a sectional view taken on line 2—2 of Fig. 1.

Fig. 3 is a sectional view taken on line 3—3 of Fig. 1.

Fig. 4 is an enlarged view showing the wrapping for the cables.

Like numerals refer to like parts throughout the several figures.

In the construction shown the eye bar is made up of two pin engaging members 1 and 2 having holes 3 and 4 therethrough for the pins by means of which the eye bars are supported in the structure. A continuous cable 5 connects the two pin engaging members together so as to receive and transmit the stresses. If desired a supporting device may be provided between the pin engaging members for maintaining them in their separated position while they are being shipped and installed.

This support may be arranged so as to be permanent if desired.

In the construction shown in Figs. 1 to 3, I have shown such a support consisting of the longitudinal members 6 and 7 which are preferably arranged with a groove for the cable and which are connected together by the diagonal members 8. The several parts may be integral or the diagonal members may be fastened by welding or otherwise to the members 6 and 7.

In the particular construction illustrated in Figs. 1 to 3, the pin engaging members are provided with projections 8a and 9 connected therewith in any desired manner as by welding, said pin engaging members being attached to the parts 10 and 11 connected with the supporting device. This connection may be made through suitable fastening devices extending through elongated holes 12 in one of the parts, as for example, the projecting parts 8a and 9. The support may be left in such position when the eye bar is installed, if desired.

In assembling the device the support is placed between the pin engaging members and the fastening device 13 loosened so that the pin engaging members may be moved toward each other. The cable is then placed around the pin engaging members and they are then separated to their normal positions and the fastening device 13 tightened up so as to hold the parts in this position.

The cables may be of any suitable form made up of the desired number of strands. The cables are preferably provided with a protecting wrapping 5a extending around them as shown in Fig. 4, the wrapping preferably extending the entire length of the cable. I have also shown the device as having the pins 3a and 4a in position.

I claim:

1. An eye bar comprising a continuous cable, two separated pin engaging members over which the cable is looped and a temporary supporting device interposed between the pin engaging members to hold the parts in position for shipment and erection.

2. An eye bar comprising a continuous cable, two separated pin engaging members over which the cable is looped and a support removably connected with said pin engaging members to hold the parts in position for shipment and erection.

3. An eye bar comprising a continuous cable, two pin engaging members provided with flanges to hold the cable in position and over which the cable is looped and a longitudinally extending supporting device to hold the parts in position for shipment and erection said longitudinally extending supporting device being removably connected in position.

4. An eye bar comprising a continuous cable, two pin engaging members provided with flanges to hold the cable in position and over which the cable is looped, an opening through said pin engaging members for a connecting pin, and supporting members engaging the pin engaging members to hold the parts in position for shipment and erection.

5. An eye bar comprising a continuous cable, two pin engaging members over which the cable is looped and supporting members engaging the inner face of the looped cable and connected with said pin engaging members to hold the parts in position for shipment and erection.

Signed at Chicago, county of Cook, and State of Illinois, this 22nd day of July, 1927.

JOSEPH B. STRAUSS.